United States Patent
Sevelsted

(10) Patent No.: US 6,386,312 B1
(45) Date of Patent: May 14, 2002

(54) HYDROSTATIC STEERING ARRANGEMENT WITH DUAL CONTROL SYSTEMS

(75) Inventor: Nils E. Sevelsted, Nordborg (DK)

(73) Assignee: Sauer-Danfoss Holding A/S, Nordborg (DK)

(*) Notice: Subject to any disclaimer, the term of this patent is extended or adjusted under 35 U.S.C. 154(b) by 0 days.

(21) Appl. No.: 09/649,977

(22) Filed: Aug. 29, 2000

(30) Foreign Application Priority Data

Sep. 21, 1999 (DE) .......................... 199 45 125

(51) Int. Cl.$^7$ .............................. F16D 31/00; B62D 1/22
(52) U.S. Cl. .......................... 180/417; 180/406; 91/509
(58) Field of Search ................... 180/417, 405, 180/406; 60/384, 405, 406, 387, 484; 91/509; 137/625.23

(56) References Cited

U.S. PATENT DOCUMENTS

| 4,184,332 A | * | 1/1980 | Liebert .................. 60/386 |
| 5,799,694 A | * | 9/1998 | Uppal .................. 137/625.24 |
| 6,131,389 A | * | 10/2000 | Sorensen .................. 60/384 |
| 6,209,677 B1 | * | 4/2001 | Bohner et al. .................. 180/406 |

* cited by examiner

Primary Examiner—Anne Marie Boehler
Assistant Examiner—Tony Winner
(74) Attorney, Agent, or Firm—Lee, Mann, Smith, McWilliams, Sweeney & Ohlson

(57) ABSTRACT

A hydrostatic steering arrangement with two control systems, each of which has a control unit with an inner and an outer rotary slide and a steering motor, one steering handwheel being common for both control units, and the control units being arranged in series in the axial direction of the rotary slides. On a failure of one control unit it is desired that the steering can be continued with a relatively high accuracy. For this purpose, a common inner rotary slide is provided for both control units.

8 Claims, 2 Drawing Sheets

HYDROSTATIC STEERING ARRANGEMENT WITH DUAL CONTROL SYSTEMS

Figure 1:
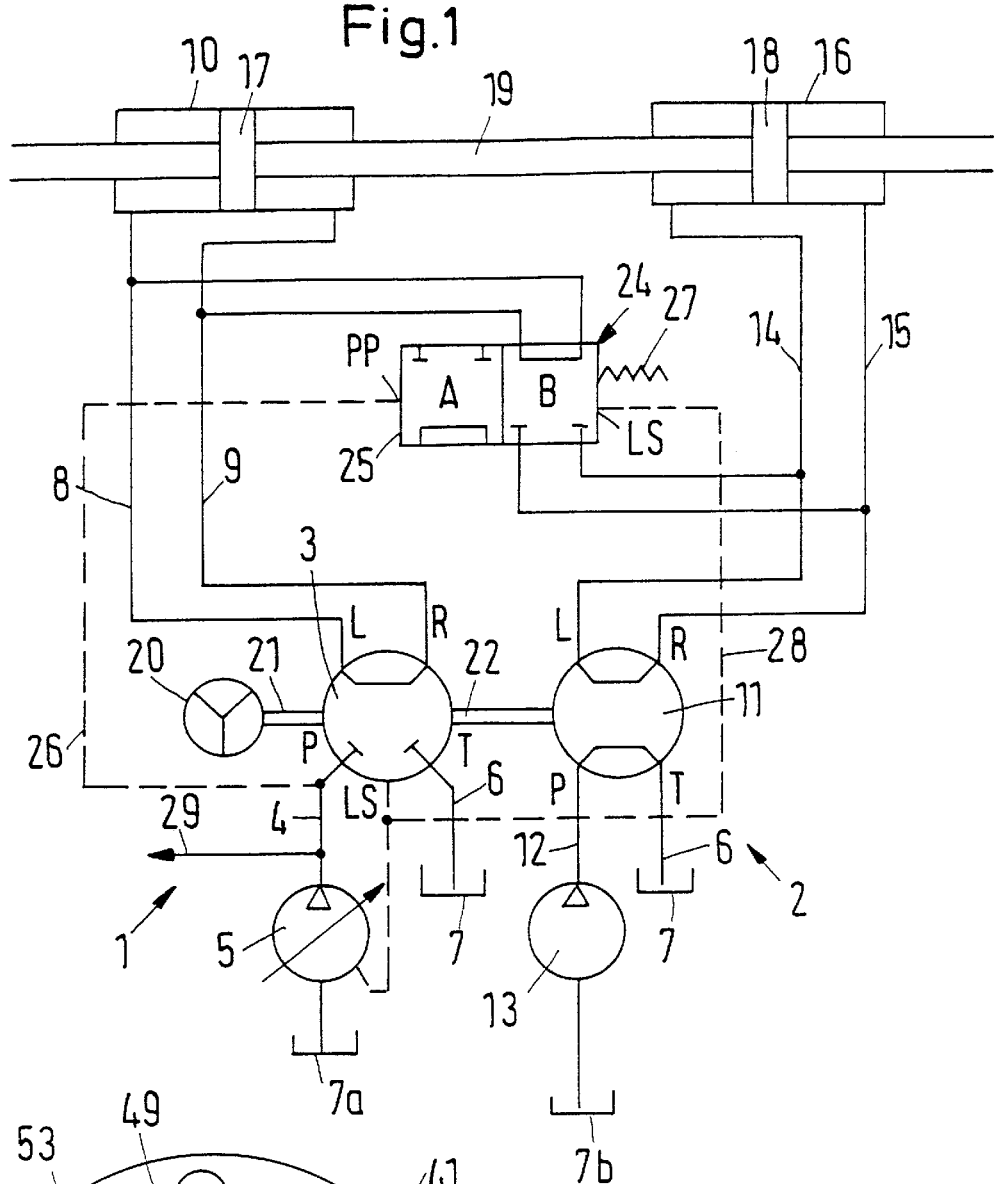

The invention concerns a hydrostatic steering arrangement with two control systems, each of which having a control unit with inner and outer rotary slide and a steering motor, one steering handwheel being common for both control units, and the control units being arranged in series in the axial direction of the rotary slides.

A steering arrangement of this kind is known from DE 196 22 731 C2.

A steering arrangement of this kind particularly serves the purpose of steering a vehicle. The two control systems are provided to make sure that on failure of one control system, the vehicle is still steerable by means of the other control system. As in the known case, the present invention also comprises a change-over valve, which changes over on failure of one control system, to make the other control system perform the steering. As both control units are operated by the same steering handwheel, the user should not feel a shift between the two control units. A failure of a control system should be displayed to the user.

However, in the known case, this cannot be realised to a sufficient degree. Each of the two control units namely has a cardan shaft, which is called a "dog bone". This cardan shaft is required to make sure that the rotary movement of the measuring motor, in which a gear wheel is rotating and orbiting, can be transmitted to the outer rotary slide. The cardan shaft is connected with the gear wheel via a multi-spline connection. This connection always has a small tolerance. The connection from the steering handwheel to the second control unit has a correspondingly larger number of cardan shafts, which, in a similar way, are connected with heir counterparts by means of multi-spline connections, so that when operating the second control unit the operator experiences a much larger tolerance than when operating the first control unit. Accordingly, the steering behaviour of the steered vehicle in case of failure, that is on a failure of the first control system, is substantially more inaccurate. The operation behaviour of the vehicle is thus deteriorated, which should be avoided.

The invention is therefore based on the task of providing a steering, which works with a higher accuracy, also on failure of a control unit.

In a hydrostatic steering arrangement as mentioned in the introduction, this task is solved in that an inner rotary slide is provided, which is common for both control units.

The rotary slide is thus operated by the steering handwheel for both control units, and in both cases with exactly the same influence on the operation behaviour of the control unit in question. This is simply realised in that the inner rotary slide is extended in the axial direction in such a way that it can evolve the desired effect in both control units. In this connection, the inner rotary slide can be made in one piece. It can, however, also be made from two known rotary slides, which are unrotatably connected with each other. As the inner rotary slide is the only component having an immediate counter-effect on the user, this measure provides that the steering behaviour of the vehicle is always felt to be the same, independently of which of the two control units is effective.

Preferably, the outer rotary slide is also provided to be common for both control units. This makes it possible not only to let the immediate counter-effect on the operator be the same, both in the case of no failure and in the case of failure. Also the effects on the vehicle are then practially the same. The outer rotary slide is always rotated and following in the same way, independently of the question, which of the two control units is presently active. Additionally, this embodiment has the advantage that the inner and the outer rotary slides of each control unit are constantly moved, also when the second control unit is not active due to an unfailing operation of the first control unit. In this way it is prevented that any parts may get stuck. Thus, the second control unit is also always ready for operation.

Preferably, a measuring motor, which rotates the outer and the inner rotary slide of a control unit in relation to each other, has a toothed ring arranged eccentrically to the rotation axis of the rotary slide, in which toothed ring a gear wheel rotates and orbits, the gear wheel meshing so as to be rotary torque transmitting with the outer rotary slide. With this embodiment, the principle of a measuring motor, in which the gear wheel orbits and rotates in the toothed ring by way of the corresponding hydraulic pressures, can still be used. However, at the same time it may be ensured that the rotary slides can be driven without the insertion of eccentrically arranged driving parts. This simplifies the use of through rotary slides.

In this connection it is particularly preferred that the gear wheel has an inner toothing, which only meshes with an outer toothing of the outer slide on part of the circumference. This is a relatively simple way of realising a transmission of the rotary movement of the gear wheel to the outer slide without also transmitting the orbiting movement. The orbiting movement is simply absorbed in that in certain circumferential areas of the outer slide an adequate interstice is left open between gear wheel and slide. when the gear wheel orbits, the meshing between gear wheel and outer slide travels in the circumferential direction.

Preferably, each control unit has its own housing, and apart from a rotary transmission leadthrough on one front side of one housing, the housings are the same. Of course, one common housing for both control units can also be used. Using two separate housings, however, makes it possible to resort to housings, which are known and available from single control units. This simplifies both production and stocking. One of the housings merely has to be provided with a rotary transmission leadthrough, so that the shaft for the steering handwheel can be brought to meshing with the inner slide.

Preferably, the two housings are connected with each other through the insertion of a measuring motor section. In other words, the measuring motor section lies between the two housings and thus between the two control units. This gives a substantially symmetrical embodiment, which causes an additional improvement of the operating behaviour.

In this connection a preferred embodiment provides that the measuring motor section has a measuring motor for each control unit. Thus, the two control units are completely self-contained, so that, for example, also the failure of one measuring motor has no influence on the functioning of the steering arrangement.

In this connection a preferred embodiment may provide that in the measuring motor section at least one supply line is arranged to connect the two control units. The supply line can pass through the measuring motor section. Thus, a wiring from one control unit to the other on the outside of the housings can be saved.

In the following, the invention is described in detail on the basis of a preferred embodiment in connection with the drawings, showing:

FIG. 1 a schematic block circuit diagram of a steering arrangement

Figure 2:
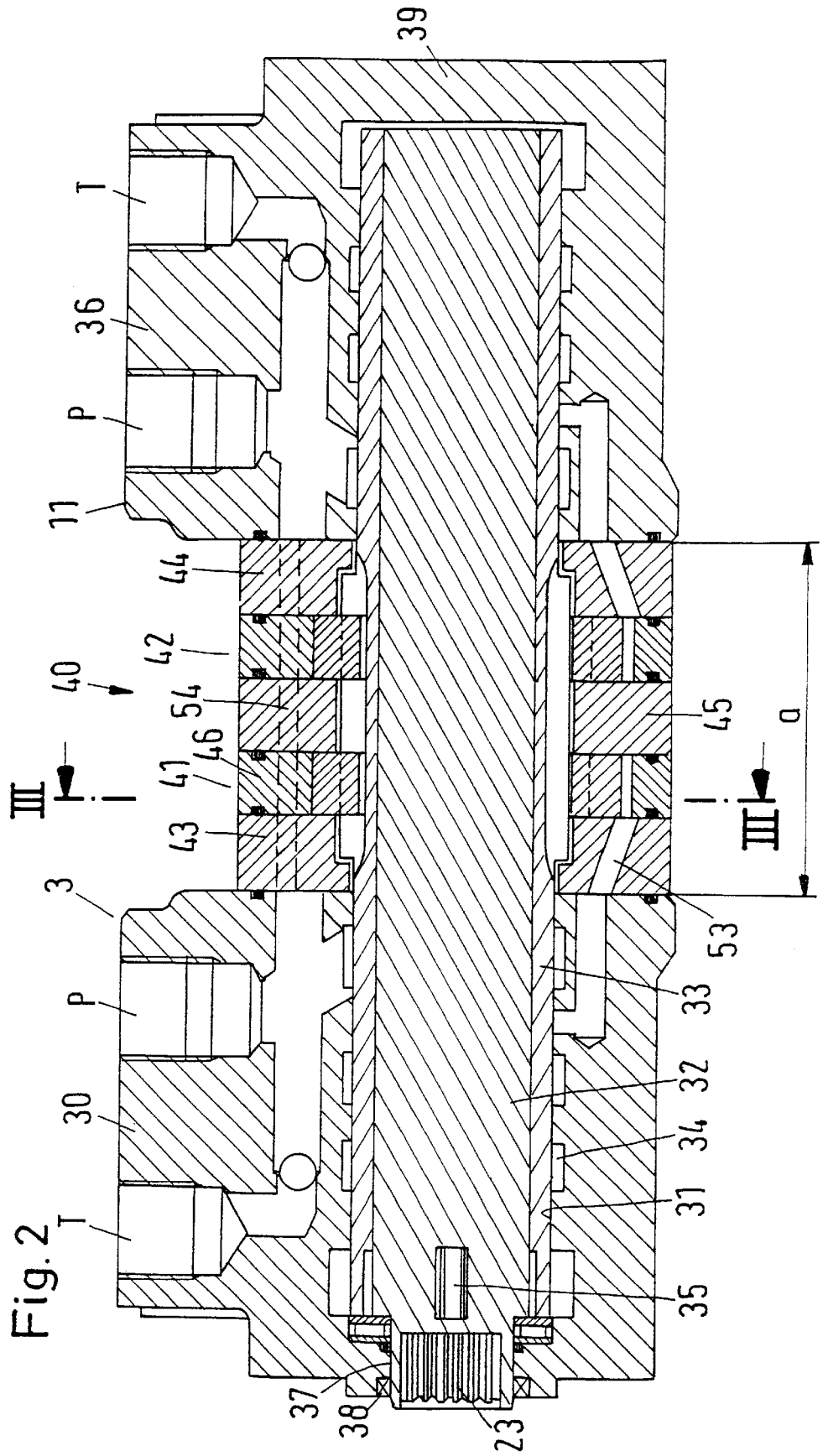

FIG. 2 a schematic longitudinal section through two combined control units

Figure 3:
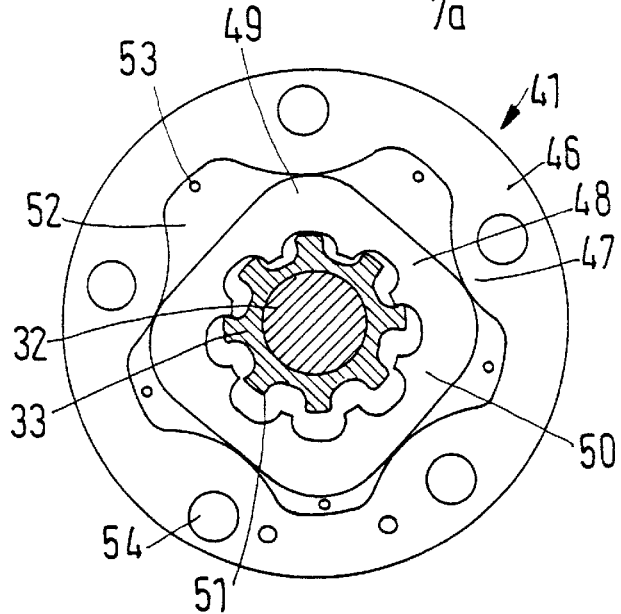

FIG. 3 a section III—III according to FIG. 2

FIG. 1 shows a first control system 1 and a second control system 2. The first control system 1 has a first control unit 3, whose pump inlet P is connected with a controllable pump 5 via a pump line 4 and whose tank inlet T is connected with a tank 7 via a tank line 6. Each of two motor connections L and R are connected with a first steering motor 10 via motor lines 8 and 9, respectively. In the same way, a second control unit 11 is provided, whose pump inlet P is connected with a pump 13, supplying a constant volume, via a pump line 12 and whose tank connection T is connected with the tank 7 via a tank line 6. Each of the two motor connections L and R are connected with a second steering motor 16 via motor lines 14 and 15, respectively. The pistons 17 and 18 of the two steering motors 10 and 16 are connected with each other via a common piston rod 19, which also acts upon the wheels to be steered (not shown). A steering handwheel 20 is connected with the inlet shaft 21 of the first control unit 3. Schematically shown is a connection 22, which is intended to show that the steering handwheel 20 does not only operate the first control unit 3, but also the second control unit 11.

A change-over valve 24 can assume an operating position A, in which the motor lines 14 and 15 of the second control system 2 are connected with each other, and an emergency position B, in which the motor lines 8 and 9 of the first control system are connected with each other. When changing over, it is provided that there are no intermediary positions, in which the motor lines of the two control systems get in touch with each other. A slide serves as adjusting device 25. On one front side acts the inlet pressure PP, which is taken from the pump line 4 and supplied via a pressure signal line 26. On the opposite side acts a spring 27 and the load pressure LS, which is supplied from the LS-connection of the first control unit 3 via a pressure signal line 28 and also influences the supply quantity of the first pump 5.

Via a line 29 the pump 5 can also supply additional consumers, if required also through the insertion of a priority valve. Besides, the tank 7a, from which the first pump 5 takes in pressure fluid, is arranged in a higher level than the tank 7b, from which the second pump 13 takes in pressure fluid.

This gives the following mode of operation: When the steering arrangement is turned on, that is, the two pumps 5 and 13 are activated, the power produced by the inlet or pump pressure PP exceeds the power of the spring 27 and the power produced by the load pressure LS, so that the change-over valve 24 changes to the operating position A. This means that in the first control system 1, the control unit 3 supplies a pressure fluid quantity corresponding to the rotation angle to the steering motor 10. The second control unit 11 is supplied with pressure fluid from the pump 13, however, exerts no power on the steering motor 16, as the two motor lines 14 and 15 are short-circuited. The operation of the second control unit 11 therefore requires no or almost no additional torque on the steering handwheel 20.

When the pump 5 fails or supplies no more fluid due to a line rupture, for example of the motor lines 8 and 9, the inlet pressure PP drops heavily, which causes the change-over valve 24 to switch to the emergency position B. Now the second control system 2 is fully active, whereas the first control unit 3 is short-circuited towards the motor side. Accordingly, the torque required to operate the steering handwheel 20 is only slightly higher than the torque required to operate the second control unit. Also when on a line rupture the tank 7a of the first pump 5 is completely empty, the second pump 11 can work safely, as its tank 7b or its take-in opening, respectively, lies lower, which means that pressure fluid is available for the second control system.

The automatic switching from the operating position A to the emergency position B causes a change from control system 1 to control system 2; however, the torque required for the steering remains substantially the same. As each starting and stopping of the steering arrangement causes a displacement of the change-over valve 24, and each operation of the steering handwheel 20 causes a displacement of the control unit 11, it is ensured that in the emergency the change-over valve 24 and the control unit 11 are sure to function.

In principle, an embodiment like this is known from DE 196 22 731 C2.

The control units 3 and 11 are now shown schematically in a longitudinal section in FIG. 2.

The control unit 3 has a housing 30 with a bore 31, in which an inner slide 32 and an outer slide 33 are arranged to be concentrical. The rotary slides 32, 33 are rotatable in relation to each other and to the housing 30. In a manner not shown in detail, their circumferences have control openings and control passages, which cooperate with corresponding control channels 34 in the housing 30. In this connection, the inner rotary slide 32 is provided with a multi-spline connector 23, into which the inlet shaft 21 of the steering handwheel 20 can be inserted. When the inner slide 32 is rotated in relation to the outer slide 33, it releases, in dependence of the rotation direction, a connection from the pump connection to one of the two motor connections L, R. By means of an additional measuring motor, described in detail later, the outer rotary slide 33 is made to follow the inner rotary slide 32, so that after the passing of a quantity of hydraulic fluid to the steering motor 10, 18, corresponding to the rotary angle of the steering handwheel 20, the two rotary slides 32, 33 return to their original overlapping. A spring arrangement 35 prestresses the two rotary slides 32, 33 in their neutral position.

The control unit 11 has a housing 36, which has exactly the same embodiment as the housing 30, with the one difference that opening 37 meant for passing the inner rotary slide 32 to the outside and the bearing 38 are not provided in the housing 36. On the contrary, the front wall 39 arranged here is closed.

Between the two housings 30, 36 a measuring motor section 40 is arranged. For reasons of clarity, the bolts or other fixing elements, fixing the two housings 30, 36 and the measuring motor section 40 axially to each other, are not shown in detail.

The measuring motor section 40 has a measuring motor 41 for the control unit 3 and a second measuring motor 42 for the control unit 11. Between the control unit 3 and the belonging measuring motor 41 a control channel plate 43 is arranged, and between the control unit 11 and its measuring motor 42, a control channel plate 44 is arranged. Both measuring motors 41, 42 are separated from each other by an intermediary plate 45.

FIG. 3 shows a cross section through the measuring motor 41. In the housing 46 is arranged a toothed ring with five inwardly projecting teeth 47. In this toothed ring, a gear wheel 48 is arranged, which has one tooth 49 less than the number of teeth 47 of the toothed ring. In the present case, the gear wheel 48 thus has four teeth and looks like a square with rounded edges. However, this is not required. The number of teeth 47, 49 depends on the conditions.

The gear wheel 48 again has an inner toothing 50, which engages with an outer toothing 51 of the outer rotary slide 33. For this purpose, the tooth engagement between the inner toothing 50 and the outer toothing 51 always extends only on part of the circumference of the outer rotary slide 33. Accordingly, it is possible that the gear wheel 48 rotates and orbits in the housing 46, when some pressure chambers 52, formed between the gear wheel 48 and the housing, are alternatingly supplied with high and low pressure. Only the rotary movement, however, is transferred to the outer rotary slide 33. Accordingly, the arrangement of inner rotary slide 32 and outer rotary slide 33 can remain concentrically in the housing, while actually the gear wheel is currently arranged eccentrically.

Schematically shown are pressure channels 53, through which hydraulic fluid is supplied or drawn off to make the gear wheel 48 rotate and orbit.

After having ensured by means of the embodiment shown that in spite of an eccentric arrangement of the gear wheel 48, a transfer of the rotary share of the movement of the gear wheel 48 to the outer rotary slide 33 is possible, all cardan shafts, which were usually required for such arrangements, can be avoided. It can now be ensured that the two rotary slides 32, 33 can act in common for both control units 3, 11. For this purpose it is merely required that the rotary slides 32, 33 are extended accordingly, so that they are both through parts. In this connection, each rotary slide 32, 33 can be made in one piece. However, it is also possible to make each rotary slide 32, 33 of two or more parts, only it must be ensured that their connection is unrotatable and thus substantially without play.

The fact that now the inner rotary slide 32 passes through from the first control unit 3 to the second control unit 11, ensures that an operation of the first control unit 3 by the rotary slide 32 has the same effect also on the second control unit 11. Any angle differences, which could be caused by a play between spline or other connections, are avoided. The same also applies for the outer rotary slide 33. The fact that it is made as a through part also makes the reaction of both control units 3, 11, to a steering absolutely equal.

Additionally, the design shown enables a very simple embodiment. The number of movable parts to be connected with each other is substantially reduced in relation to the known case (DE 196 22 731 C2).

Also with the design shown, it is ensured in a simple way that on each rotary movement the rotary slides 32, 33 are moved in both housings 30, 36 of the control units 3, 11. Thus, there is no risk that one steering system or the other gets stuck.

Now, the measuring motor section can also be used to introduce individual channels 54, for example to provide a common tank line for both control units 3, 11. In FIG. 2 such a channel 54 is drawn with dotted lines to suggest that it is not in the section level.

It is not required to arrange the measuring motor section 40 between the two control units 3, 11. The two control units 3, 11 can also be arranged in a common housing, with the measuring motor section arranged on a front side. The embodiment shown has the advantage, however, that known and available housings 30, 36 can be used.

Different displacements in the two measuring motors 41, 42 may be arranged. This can, for example, be obtained in that the axial length of the individual measuring motors 41, 42 is changed. When, however, the rotary slides 32, 33, shown, should still be used, the length a must be kept constant.

What is claimed is:

1. Hydrostatic steering arrangement with two control systems, each of which includes a control unit with an inner and an outer rotary slide and a steering motor, one steering handwheel being common for both control units, the control units being arranged in series in an axial direction of inner and outer rotary slides of the control units, and in which the inner rotary slide is common for both control units.

2. Steering arrangement according to claim 1, in which an outer rotary slide is also common for both control units.

3. Steering arrangement according to claim 1, including a measuring motor which rotates the outer and the inner rotary slide of a control unit in relation to each other, the measuring motor having a toothed ring arranged eccentrically to a rotation axis of the rotary slides, the toothed ring having a gear wheel which rotates and orbits, the gear wheel meshing so as to be rotary torque transmitting with the outer rotary slide.

4. Steering arrangement according to claim 3, in which the gear wheel has an inner toothing, which only meshes with an outer toothing of the outer slide on part of a circumference of the outer slide.

5. Steering arrangement according to claim 1, in which each control unit includes a housing, and apart from a rotary transmission lead through on one front side of one housing, the housings being the same.

6. Steering arrangement according to claim 5, in which the two housings are connected with each other through a measuring motor section between the housings.

7. Steering arrangement according to claim 6, in which the measuring motor section has a measuring motor for each control unit.

8. Steering arrangement according to claim 6, including at least one supply line in the measuring motor section connecting the two control units.

* * * * *